United States Patent
Iyengar

(10) Patent No.: US 6,954,752 B2
(45) Date of Patent: Oct. 11, 2005

(54) METHODS AND APPARATUS FOR CLUSTERING AND PREFETCHING DATA OBJECTS

(75) Inventor: Arun Kwangil Iyengar, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 655 days.

(21) Appl. No.: 09/909,287

(22) Filed: Jul. 19, 2001

(65) Prior Publication Data

US 2003/0018639 A1 Jan. 23, 2003

(51) Int. Cl.$^7$ ............................................. G06F 17/30
(52) U.S. Cl. .......................... 707/8; 707/10; 707/202; 709/202; 714/31
(58) Field of Search ........................ 707/3, 8, 10, 100, 707/202, 200; 714/31; 709/202, 224

(56) References Cited

U.S. PATENT DOCUMENTS

| | | | | |
|---|---|---|---|---|
| 5,829,001 A | * | 10/1998 | Li et al. ...................... 707/10 |
| 5,870,559 A | * | 2/1999 | Leshem et al. ............. 709/224 |
| 5,889,935 A | * | 3/1999 | Ofek et al. .................... 714/6 |
| 5,901,327 A | * | 5/1999 | Ofek .............................. 710/5 |
| 5,953,728 A | * | 9/1999 | Horowitz et al. ........... 707/202 |
| 5,995,981 A | * | 11/1999 | Wikstrom .................... 707/202 |
| 6,021,408 A | * | 2/2000 | Ledain et al. ................. 707/8 |
| 6,073,255 A | * | 6/2000 | Nouri et al. .................. 714/31 |
| 6,088,816 A | * | 7/2000 | Nouri et al. .................. 714/31 |
| 6,122,746 A | * | 9/2000 | Nouri et al. ................ 713/310 |
| 6,138,250 A | * | 10/2000 | Nouri et al. .................. 714/31 |
| 6,266,721 B1 | * | 7/2001 | Sheikh et al. .............. 710/100 |
| 6,397,227 B1 | * | 5/2002 | Klein et al. ................. 707/200 |
| 6,553,369 B1 | * | 4/2003 | Guay et al. ..................... 707/3 |
| 6,654,754 B1 | * | 11/2003 | Knauft et al. ............... 707/100 |
| 2002/0165902 A1 | * | 11/2002 | Robb et al. ................. 709/202 |

OTHER PUBLICATIONS

J. Hennessy et al., "Computer Architecture: A Quantitative Approach" 2nd Ed., Chapter 6, (Sections 6.2 (pp. 485–495) and 6.11 (pp. 553–557), 1996.

E. Markatos et al., "Secondary Storage Management for Web Proxies," Proceedings of USITS '99: The 2$^{nd}$ USENIX Symposium on Internet Technologies & Systems, Boulder, CO, 13 pages, Oct. 11–14, 1999.

* cited by examiner

*Primary Examiner*—Shahid Al Alam
(74) *Attorney, Agent, or Firm*—Rafael Perez-Pineiro; Ryan, Mason & Lewis, LLP

(57) ABSTRACT

Techniques for managing data objects in conjunction with a computer system are provided. In a technique for clustering data objects on a disk storage device, the invention comprises maintaining a log of at least a portion of accesses (e.g., read and for write operations) to the data objects; determining from the maintained log a cluster comprised of data objects accessed at substantially similar times; and storing the data objects comprising the cluster in close proximity to one another on the disk storage device. In a technique for prefetching data objects on a disk storage device, the invention comprises receiving a request for a data object in a cluster, determining from the log a probability that at least one other data object in the cluster may be subsequently requested; and, in response to the probability being not less than a predetermined value, retrieving both the requested data object and the at least one other data object. Such clustering and prefetching techniques substantially reduce the number of storage device seeks.

21 Claims, 3 Drawing Sheets

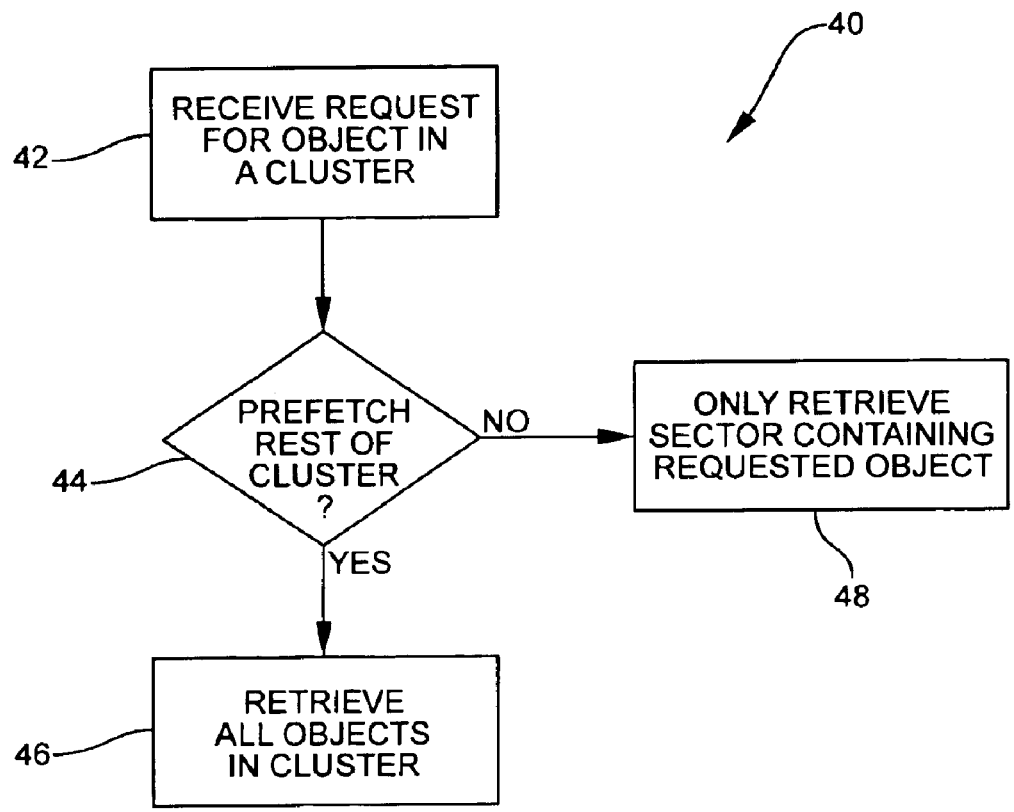

METHODS AND APPARATUS FOR CLUSTERING AND PREFETCHING DATA OBJECTS

FIELD OF THE INVENTION

The present invention relates to data storage techniques and, more particularly, to techniques for clustering and prefetching data objects in accordance with data storage devices.

BACKGROUND OF THE INVENTION

Disk storage operates inefficiently when a large number of memory seeks (searches) are necessary to fetch (read) or store (write) data objects from or to a disk storage device. This is typically because data objects that may be accessed in a relatively close temporal proximity to one another may have to be fetched from or stored in many different sectors of the memory associated with the storage device. Sectors and disk storage systems are well known in the art, e.g., as described in J. Hennessy et al., "Computer Architecture: A Quantitative Approach" 2nd ed., chapter 6 (sections 6.2 and 6.11), 1996, the disclosure of which is incorporated by reference herein.

The accessing inefficiency of such conventional disk storage techniques result in a high processing overhead. This is a known problem with many databases and file systems. While, file systems may have a lower overhead than databases, file system performance can be quite poor for file creation and file deletion. High overhead can also be a serious problem for storage environments such as proxy caches on the World Wide Web, where data object creation and data object deletion constitute a significant fraction of request traffic.

Thus, there is a need for data storage techniques which address these inefficiency and overhead issues, as well as other related issues.

SUMMARY OF THE INVENTION

The present invention provides techniques for managing related objects in accordance with a data storage device in order to reduce the number of storage device seeks. The invention is applicable to a broad range of applications including, but not limited to, disk storage for the World Wide Web, e.g., Web proxy caches. While the invention is particularly applicable to disk storage, it can be applied to other forms of storage as well.

In one aspect of the invention, techniques are provided for analyzing read and/or write patterns with respect to a data storage device in order to cluster related objects in proximity to each other in the memory of the data storage device. For example, if a set of objects are typically accessed in close temporal proximity to one another, the invention provides for storing them on one or a small number of sectors on the disk thereby reducing the overhead for reading them, as compared with a conventional approach where the objects are scattered randomly across many sectors.

In another aspect of the invention, analysis of read and/or write patterns is also used to perform intelligent prefetching of data objects stored on a data storage device. If, for example, whenever an object x1 is accessed, there is a high probability that objects x2, x3, and x4 will be accessed in the near future, the invention realizes that it may be advantageous to pre-emptively fetch x2, x3, and/or x4 in response to an access to x1 before x2, x3, and/or x4 are explicitly accessed. Thus, again, the overhead for reading the data storage device is reduced.

These and other objects, features and advantages of the present invention will become apparent from the following detailed description of illustrative embodiments thereof, which is to be read in connection with the accompanying drawings.

BRIEF DESCRIPTION OF THE DRAWING

FIG. 4 is a flow diagram illustrating a method of prefetching related data objects in accordance with one embodiment of the present invention; and FIG. 5 is a diagram illustrating a read/write log maintained in accordance with one embodiment of the present invention.

DETAILED DESCRIPTION OF PREFERRED EMBODIMENTS

The present invention will be explained below in the context of an illustrative World Wide Web or Internet-based environment, particularly with respect to disk storage associated with a Web server or a proxy server. However, it is to be understood that the present invention is not limited to such a particular environment or application. Rather, the invention is more generally applicable to any data storage environment or application in which it is desirable to substantially reduce overhead associated with accessing memory associated with a data storage device. That is, the techniques of the invention may be applied to any data storage devices such as disk storage systems or any other memory-based devices such as, for example, RAM, ROM, fixed memory devices (e.g., hard drive), removable memory devices (e.g., diskette), etc.

It is to be understood that, as used herein, the phrase "data object" is intended to refer to any storable data or information. By way of example only, in the context of the Web, a data object may be some form of Web data such as an HTML (HyperText Markup Language) file, an image file, etc. However, it is to be understood that the invention is not limited to any particular form of data or information.

Figure 1:
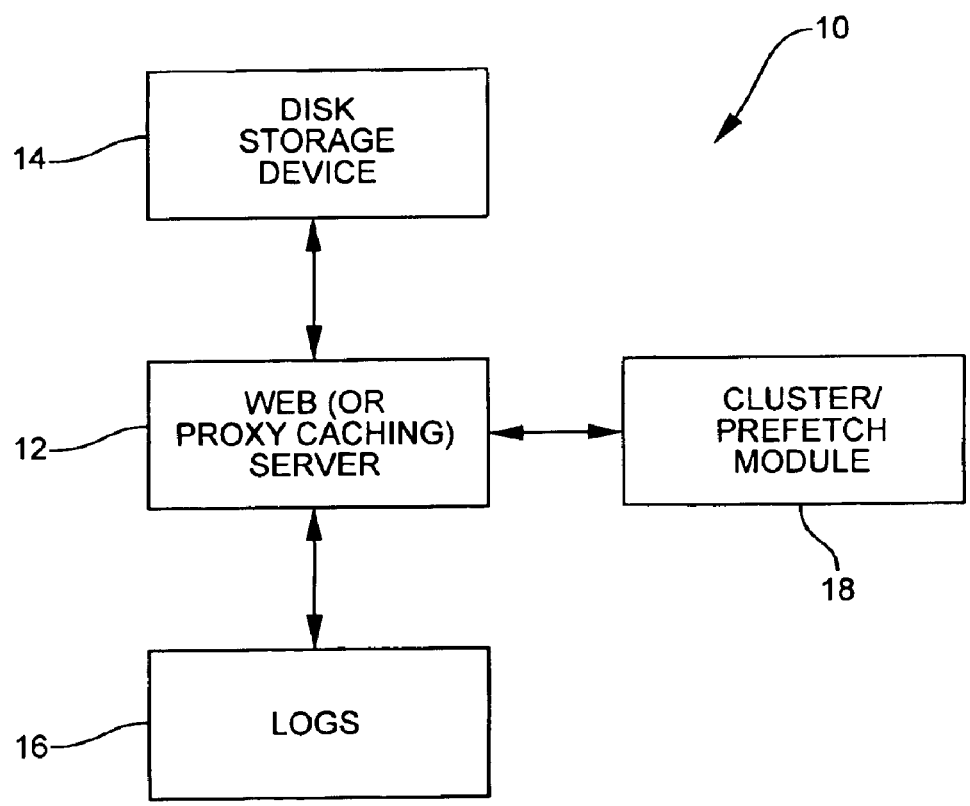
FIG. 1 is a block diagram illustrating a system capable of efficiently clustering and prefetching related data objects on a disk in accordance with one embodiment of the present invention.

Referring initially to FIG. 1, a block diagram illustrates a system 10 with apparatus capable of efficiently clustering and prefetching related data objects on a disk in accordance with one embodiment of the present invention. The system 10 may be used for efficiently storing Web data, although the system is not limited thereto. As shown, the system 10 comprises a Web server system 12. The Web server system may be a proxy caching system. Examples of server and proxy caching systems that may be employed to implement the Web server system 12 are disclosed in E. Markatos et al., "Secondary Storage Management for Web Proxies," Proceedings of USITS 1999, the disclosure of which is incorporated by reference herein. It is to be understood that the server system 12 may, itself, comprise one or more server computer systems.

The system 10 also comprises a disk storage device 14. While a single disk storage device 14 is depicted, it is to be understood that the system 10 of the invention may operate with one or more such disk storage devices. The Web server system 12 can store large amounts of data on the disk storage device. For example, the data may be objects that are retrieved on the Internet by the server system, or sent to a client computer operatively coupled to the server system via the Internet, in response to client requests. The data may also be objects created at the client's request. As will be explained below, the server system 12 maintains logs 16 of activity prompted by client requests. For example, in accordance with the invention, the stored logs may maintain a history of read/write operations associated with the disk storage device that have been necessitated by client requests (e.g., a read operation in association with deleting a data object at client's request, a read operation in association with accessing and sending a data object to the client at client's request, a write operation in association with storing a data object at client's request, a write operation in association with creating a data object at client's request, etc.). Logs 16 may be maintained on the disk storage device 14 or some other memory associated with the system 10, although it is to be understood that the logs may be maintained in memory separate from system 10.

Figure 2:
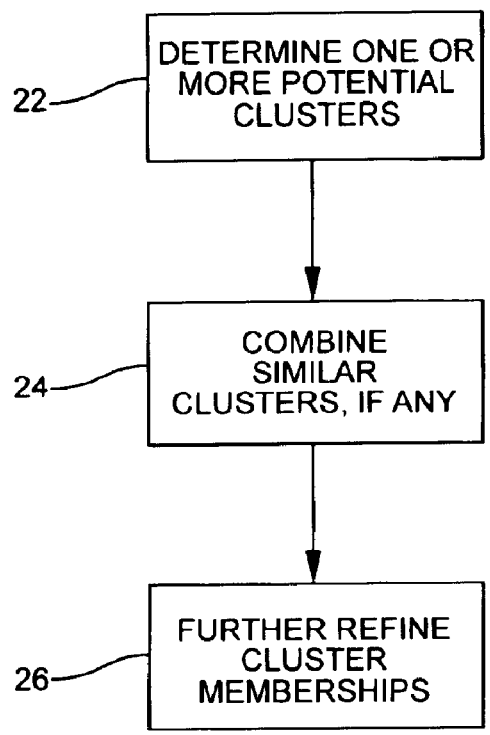
FIG. 2 is a flow diagram illustrating a method of clustering related data objects in accordance with one embodiment of the present invention.
Figure 3:
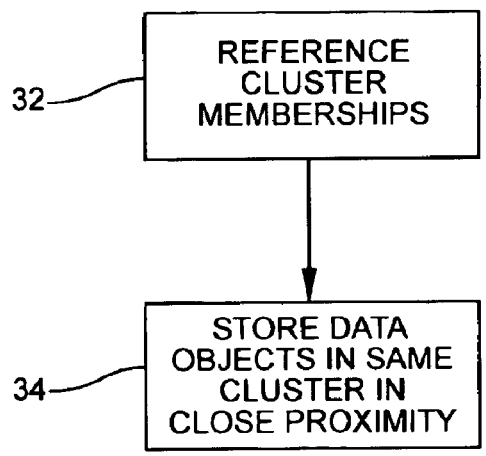
FIG. 3 is a flow diagram illustrating a method of storing related data objects in accordance with one embodiment of the present invention.

The system 10 also comprises a cluster/prefetch module 18. As mentioned above and as will be illustratively explained below, clustering and/or prefetching related data objects in association with disk storage device 14 may reduce disk overhead considerably. The module 18 analyzes logs 16 to make intelligent clustering and/or prefetching decisions. FIGS. 2–4 depict functions performed by the cluster/prefetch module 18 in accordance with the invention.

It is to be understood that, while the cluster/prefetch module 18 is shown separate from the Web server system 12, the module 18 may be implemented within one or more of the servers that constitute the server system. That is, the operations performed by the module 18 may be implemented in accordance with one or more processors associated with the server system. Alternatively, the module 18 may be implemented on a separate computer system, with its own processing capability, that is operatively coupled to the server system 12. In any case, the cluster/prefetch module 18 is able to access the logs via the server system such that cluster and/or prefetch operations can be performed in accordance with the disk storage device 14 via the server system 12.

It is to be appreciated that the term "processor" as used herein is intended to include any processing device, such as, for example, one that includes a CPU (central processing unit) or other processing circuitry. Also, the term "processor" may refer to one or more individual processors. Accordingly, one or more computer software programs including instructions or code for performing the clustering and/or prefetching methodologies of the invention, as described herein, may be stored in memory associated the processor (e.g., ROM, fixed or removable memory) and, when ready to be utilized, loaded in part or in whole (e.g., into RAM) and executed by the processor so as to provide one or more of the benefits described herein.

Referring now to FIG. 2, a flow diagram illustrates a method 20 of clustering related data objects in accordance with one embodiment of the present invention. As mentioned above, the method 20 may be implemented in accordance with the module 18 in FIG. 1. Also, it is to be noted that FIG. 5 will be referred to in the explanation of FIG. 1. FIG. 5 is a diagram illustrating a read/write log 50 maintained in accordance with one embodiment of the present invention. The log 50 may represent one or more of the logs 16 maintained and stored by the Web server 12, as explained above. As can be seen, the log is in tabular form and indicates a history for each object (o1, o2, etc.) as to what operation (e.g., read, write, etc.) was performed on the object at what time periods (t1, t2, t3, t4, etc.).

Thus, referring back to FIG. 2, in step 22, log 50 is examined to determine one or more potential clusters. As mentioned above, the history of log 50 includes both read and write operations performed on particular objects, and the times of the operations. A potential cluster is determined from objects which are accessed in similar time periods (where an access can either be a read operation or a write operation). If a set of objects tends to be accessed together, for example, o1, o2, and o3, so that at similar time periods, if one object is accessed, the others will likely be accessed, then o1, o2, and o3 would be placed in the same potential cluster. Thus, in step 22, these potential clusters are determined by examining the log. This initial clustering step need not be too precise because steps 24 and 26 further refine the clusters.

In step 24, similar clusters (if any) are combined. For example, if two clusters c1 and c2 both have 95% of their members being contained in the other cluster, then it is highly probable that all of their members would be combined into a single cluster.

In step 26, cluster memberships are further refined. If it is not clear whether a particular object o should be placed in a cluster c, the number of time periods in the history during which c is accessed, c(a), is determined. The number of these time periods in which o is also accessed along with c, c(o), is also determined. If c is the only candidate cluster for o and quotient c(o)/c(a) is sufficiently high, e.g., greater than or equal to a predetermined value, then o belongs in c and is added thereto. While the invention is not limited to any particular value, the predetermined value may, for example, be equal to 0.5. Alternatively, a comparison of c(o), alone, to a predetermined value (e.g., is c(o) high, that is, greater than or equal to a predetermined value) may be used to determine whether to add o to c.

If o is a candidate for multiple clusters, o could be replicated and maintained in a plurality of these clusters. This has the drawback of wasting storage. In addition, overhead could be incurred to maintain multiple updated copies of o after the object changes. In order to get around these problems, it may be desirable to only store o in one cluster or in a small number of clusters. As indicated above, preference may be given not only for a cluster c for which c(o)/c(a) is high, but also for one in which c(o) is high.

Once clusters have been defined, objects comprising the cluster are stored in close proximity to each other on disk. This is illustrated in FIG. 3. FIG. 3 is a flow diagram illustrating a method 30 of storing related data objects in accordance with one embodiment of the present invention. In step 32, the module 18 refers to the clusters determined in method 20 of FIG. 2. Then, in step 34, data objects are stored on the disk storage device 14 in accordance with the clusters. If all objects in a cluster can fit on a single sector of the disk, they are preferably stored using a single sector. If not, they are stored using as few sectors as possible.

In some cases, when one object o in a multisector cluster is accessed, it is desirable to prefetch all objects in the cluster before they are requested, even if this requires extra disk seeks. This would be the case if the access to o suggests a high probability that many of the other objects in the cluster will soon be accessed. FIG. 4 depicts a method for such prefetching.

Referring now to FIG. 4, a flow diagram illustrates a method 40 of prefetching related data objects in accordance with one embodiment of the present invention. Again, the prefetching determination may be performed by module 18 in accordance with the server system 12 and the disk storage device 14. In step 42, a request is received for an object o in a cluster c. In step 44, it is determined if there is a high probability that many of the objects in the cluster will be requested soon. This is determined from the quantity $c(o)/t(o)$, where $t(o)$ is the number of time periods o appears in the history (log). If this quotient is high, e.g., greater than or equal to a predetermined value, all objects in c are prefetched in step 46. Again, while the invention is not limited to any particular value, the predetermined value may, for example, be equal to 0.5. If $c(o)/t(o)$ is less than the predetermined value, only the sector containing o is prefetched in step 48.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of managing data objects in a computer system, the method comprising the steps of:
   maintaining a log of at least a portion of accesses to the data objects;
   determining from the maintained log at least one cluster comprised of data objects accessed at substantially similar times;
   storing the data objects comprising the at least one cluster in close proximity to one another in a memory;
   receiving a request for a data object in a cluster;
   determining from the log a probability that at least one other data object in the cluster may be subsequently requested; and
   in response to the probability being not less than a predetermined value, retrieving both the requested data object and the at least one other data object.

2. The method of claim 1, wherein an access comprises a request to one of read and write a data object.

3. The method of claim 1, wherein the data objects comprise Web data and the log comprises at least one Web log.

4. The method of claim 1, wherein the cluster determining step further comprises the steps of:
   determining a number of time periods, $c(a)$, a cluster is accessed;
   determining a number of time periods, $c(o)$, an object is accessed along with the cluster; and
   using $c(a)$ and $c(o)$ to determine whether to add the object to the cluster.

5. The method of claim 4, wherein the using step further comprises the step of computing a quotient, $c(o)/c(a)$, and adding the object to the cluster when $c(o)/c(a)$ is not less than a predetermined value.

6. The method of claim 1, wherein the cluster determining step further comprises the steps of:
   determining a number of time periods, $c(o)$, an object is accessed along with the cluster; and
   adding the object to the cluster when $c(o)$ is not less than a predetermined value.

7. The method of claim 1, wherein the step of determining from the log a probability further comprises the steps of:
   determining a number of time periods, $c(o)$, the object is accessed along with the cluster;
   determining a number of time periods, $t(o)$, the object is accessed; and
   determining the probability using $c(o)$ and $t(o)$.

8. The method of claim 7, wherein the probability determining step further comprises computing a quotient, $c(o)/t(o)$.

9. The method of claim 1, wherein the memory comprises a disk storage device.

10. Apparatus for managing data objects in a computer system, the apparatus comprising:
    at least one processor operative to: (i) maintain a log of at least a portion of accesses to the data objects; (ii) determine from the maintained log at least one cluster comprised of data objects accessed at substantially similar times; (iii) store the data objects comprising the at least one cluster in close proximity to one another in a data storage device; (iv) receive a request for a data object in a cluster; (v) determine from the log a probability that at least one other data object in the cluster may be subsequently requested; and (vi) in response to the probability being not less than a predetermined value, retrieve both the requested data object and the at least one other data object; and
    memory, operatively coupled to the at least one processor, for storing at least one of the log and a cluster membership identifying the at least one cluster.

11. The apparatus of claim 10, wherein an access comprises a request to one of read and write a data object.

12. The apparatus of claim 10, wherein the data objects comprise Web data and the log comprises at least one Web log.

13. The apparatus of claim 10, wherein the cluster determining operation further comprises: (i) determining a number of time periods, $c(a)$, a cluster is accessed; (ii) determining a number of time periods, $c(o)$, an object is accessed along with the cluster; and (iii) using $c(a)$ and $c(o)$ to determine whether to add the object to the cluster.

14. The apparatus of claim 13, wherein the using operation further comprises computing a quotient, $c(o)/c(a)$, and adding the object to the cluster when $c(o)/c(a)$ is not less than a predetermined value.

15. The apparatus of claim 10, wherein the cluster determining operation further comprises: (i) determining a number of time periods, $c(o)$, an object is accessed along with the cluster; and (ii) adding the object to the cluster when $c(o)$ is not less than a predetermined value.

16. The apparatus of claim 10, wherein the operation of determining from the log a probability further comprises: (i) determining a number of time periods, $c(o)$, the object is accessed along with the cluster, (ii) determining a number of time periods, $t(o)$, the object is accessed; and (iii) determining the probability using $c(o)$ and $t(o)$.

17. The apparatus of claim 16, wherein the probability determining operation further comprises computing a quotient, $c(o)/t(o)$.

18. The apparatus of claim 10, wherein the data storage device comprises a disk storage device.

19. In a system comprising at least one server and at least one disk storage device operatively coupled to the at least one server, apparatus for managing data objects in accordance with the at least one server and the at least one disk storage device, the apparatus comprising:
    memory for storing at least one log, the log comprising information relating to at least a portion of accesses to the data objects; and a module, operatively coupled to the log memory, and operative to: (i) cause the storing of the data objects in at least one cluster on the at least one disk storage device via the at least one server based on the at least one log: (ii) learn of a request for a data object in a cluster: (iii) determine from the log a probability that at least one other data object in the cluster may be subsequently requested; and (iv) in response to the probability being not less than a predetermined value, cause the retrieval of both the requested data object and the at least one other data object from the at least one disk storage device.

20. The apparatus of claim 19, wherein the at least one server is one of a Web server and a proxy server.

21. An article of manufacture for managing data objects in a computer system, comprising a machine readable medium containing one or more programs which when executed implement the steps of:

maintaining a log of at least a portion of accesses to the data objects;

determining from the maintained log at least one cluster comprised of data objects accessed at substantially similar times;

storing the data objects comprising the at least one cluster in close proximity to one another in a memory;

receiving a request for a data object in a cluster;

determining from the log a probability that at least one other data object in the cluster may be subsequently requested; and in response to the probability being not less than a predetermined value, retrieving both the requested data object and the at least one other data object.

* * * * *